United States Patent
Lee et al.

(10) Patent No.: US 11,831,263 B2
(45) Date of Patent: Nov. 28, 2023

(54) MOTOR CONTROL DEVICE, MOTOR CONTROL SYSTEM, AND MOTOR CONTROL METHOD

(71) Applicant: LG ELECTRONICS INC., Seoul (KR)

(72) Inventors: Jungdae Lee, Seoul (KR); Sanggi Ko, Seoul (KR); Jaeyoon Oh, Seoul (KR); Gilsu Lee, Seoul (KR)

(73) Assignee: LG Electronics Inc., Seoul (KR)

(*) Notice: Subject to any disclaimer, the term of this patent is extended or adjusted under 35 U.S.C. 154(b) by 234 days.

(21) Appl. No.: 17/295,217

(22) PCT Filed: Jan. 7, 2019

(86) PCT No.: PCT/KR2019/000192
§ 371 (c)(1),
(2) Date: Dec. 6, 2021

(87) PCT Pub. No.: WO2020/105795
PCT Pub. Date: May 28, 2020

(65) Prior Publication Data
US 2022/0085744 A1 Mar. 17, 2022

(30) Foreign Application Priority Data
Nov. 20, 2018 (KR) .................. 10-2018-0143813

(51) Int. Cl.
*H02P 27/06* (2006.01)
*H02M 1/14* (2006.01)
*H02P 101/45* (2016.01)

(52) U.S. Cl.
CPC ............ *H02P 27/06* (2013.01); *H02M 1/143* (2013.01); *H02P 2101/45* (2015.01)

(58) Field of Classification Search
CPC .... H02P 27/06; H02P 2101/45; H02M 1/143; H02M 7/125
See application file for complete search history.

(56) References Cited

U.S. PATENT DOCUMENTS

| | | | |
|---|---|---|---|
| 8,625,315 | B2 | 1/2014 | Erdman et al. |
| 9,787,210 | B2* | 10/2017 | Patel ................. H02M 7/125 |
| 2016/0308453 | A1 | 10/2016 | Oates |
| 2016/0380575 | A1* | 12/2016 | Tsumura ............ F25B 49/022 |
| | | | 318/478 |
| 2017/0302160 | A1* | 10/2017 | Marcinkiewicz ....... H02P 27/06 |

FOREIGN PATENT DOCUMENTS

| | | |
|---|---|---|
| JP | 05130783 | 5/1993 |
| JP | 2001054292 | 2/2001 |
| JP | 2014233105 | 12/2014 |
| KR | 1019950026091 | 9/1995 |

OTHER PUBLICATIONS

Office Action in Korean Appln. No. 20180143813, dated Apr. 7, 2023, 10 pages (with English translation).

* cited by examiner

*Primary Examiner* — Cortez M Cook
(74) *Attorney, Agent, or Firm* — Fish & Richardson P.C.

(57) ABSTRACT

The present specification relates to a motor control device, a motor control system, and a motor control method. The motor control device measures a ripple voltage of a DC link capacitor to determine an appropriate switching frequency according to the ripple voltage, and causes a plurality of arithmetic processing units to selectively control a switching operation of the switching unit according to the determined switching frequency.

19 Claims, 4 Drawing Sheets

MOTOR CONTROL DEVICE, MOTOR CONTROL SYSTEM, AND MOTOR CONTROL METHOD

CROSS-REFERENCE TO RELATED APPLICATIONS

This application is the National Stage filing under 35 U.S.C. 371 of International Application No. PCT/KR2019/000192, filed on Jan. 7, 2019, which claims the benefit of earlier filing date and right of priority to Korean Application No. 10-2018-0143813, filed on Nov. 20, 2018, the contents of which are all hereby incorporated by reference herein in their entirety.

BACKGROUND

1. Technical Field

The present disclosure relates to a motor control device, a motor control system, and a motor control method for controlling a motor of a compressor.

2. Description of the Related Art

The background technology of the present disclosure relates to controlling a motor of a compressor.

The motor of the compressor is controlled through an inverter device including a DC link capacitor and a switching module. Such an inverter device performs a computation for controlling the operation of the switching module in a computational processing element, and generates a control signal for controlling the switching operation of the switching module according to the computation result to apply it to the switching module, thereby controlling driving power applied to the motor through the switching operation control of the switching module to control the driving of the motor. The switching operation control is related to an operation speed of the motor, and the switching speed (frequency) is controlled to be low when the motor operates at a low speed, and the switching speed is controlled to be high when the motor is operated at a high speed. Such low-speed/high-speed switching control is particularly important for motor control of a vehicle compressor that frequently operates at high speeds, and high-speed switching control is often carried out since the motor of the vehicle compressor frequently operates at high speeds. When the high-speed switching operation is performed as described above, a burden is placed on a ripple voltage of the DC link capacitor included in the inverter device and the computational processing of the computational processing element.

According to inverter technologies for motor control in the related art, voltage is stabilized by employing a large-capacity electrolytic capacitor in a DC link portion that maintains voltage stabilization between an AC/DC converter (bridge diode mode) and an inverter. Such an inverter configuration employs a large-capacity capacitor, and as a result, the design and manufacturing thereof cannot be easily carried out since the configuration of the inverter becomes large, and also there is a limitation in that manufacturing costs are high due to the provision of a large-capacity capacitor. In order to simplify the design and manufacturing of the inverter and reduce the cost thereof, the DC link capacitor has been used by replacing a large-capacity electrolytic capacitor with a film capacitor. However, in case of using a film capacitor, there is a problem in that the input current harmonic and the ripple voltage increase due to switching due to a limitation that is vulnerable to the generation of the harmonic and ripple. In particular, in case of performing high-speed switching, the effect of an increase in input current harmonic and ripple voltage becomes even greater due to frequent switching.

Furthermore, when the switching operation of the switching module is controlled at a high speed, there is a restriction according to the computation limit of the computational processing element for controlling the switching operation. U.S. Pat. No. 8,625,315 B2 (published on Nov. 12, 2009) discloses the content of controlling switching frequency through a micro controller unit (MCU) used in general inverter devices, but the MCU has a limitation in that high-speed switching control over 20 [KHZ] becomes impossible due to its computation limit. In case of using such an MCU, since a variable range of the switching frequency is limited by the computation limit of the MCU, switching control cannot be easily carried out in an inverter device requiring high-speed operation and high-speed switching control.

As a result, inverter control technologies in the art have a problem in that high-speed switching frequency variation/high-speed switching operation control cannot be easily carried out due to an increase in the effect of a ripple voltage of the DC link capacitor due to high-speed switching and the computation limit of the computational processing element. These problems cause a problem in that the efficiency, usability, adequacy and reliability of motor control requiring high-speed operation and high-speed switching are deteriorated, and leads to a problem in that the control and operation of a motor requiring high-speed operation and high-speed switching cannot be efficiently carried out.

SUMMARY

An aspect of the present disclosure is to overcome the limitations of the related art as described above.

In other words, the present specification is to provide a motor control device, a motor control system, and a motor control method capable of improving the limitation of the related art as described above.

Specifically, an aspect of the present disclosure is to provide a motor control device, a motor control system, and a motor control method capable of performing high-speed switching to limit a ripple voltage of a DC link capacitor.

Furthermore, an aspect of the present disclosure is to provide a motor control device, a motor control system, and a motor control method capable of performing efficient high-speed switching and switching variation according to the ripple voltage.

In addition, an aspect of the present disclosure is to provide a motor control device, a motor control system, and a motor control method capable of performing an appropriate switching operation according to a switching frequency and control thereof.

In order to solve the foregoing objectives, a motor control device, a motor control system, and a motor control method according to the present disclosure has a technical feature of performing computational processing for controlling a switching operation through a plurality of computational processing elements to control an switching operation of a switching unit according to a ripple voltage of a DC link capacitor.

Specifically, the ripple voltage is measured to determine an appropriate switching frequency according to the ripple voltage, and computational processing for controlling the switching operation according to the determined switching frequency is selectively performed by the plurality of computational processing elements to control the switching operation of the switching unit.

In other words, a motor control device, a motor control system, and a motor control method according to the present disclosure provide a solution for measuring a ripple voltage of a DC link capacitor to determine an appropriate switching frequency according to the ripple voltage, and selectively controlling the switching operation of the switching unit according to the determined switching frequency thereby solving the above-described problem.

The above technical features may be implemented by a motor control device, a motor control system and a motor control method for controlling a motor of a compressor, or a compressor control device for controlling a compressor and a control method thereof, and the present specification provides an embodiment of each of a motor control device, a motor control system, and a motor control method having the foregoing technical feature as a problem solving means.

An embodiment of a motor control device according to the present disclosure having the above technical features as a problem solving means may include a smoothing unit that smooths power received from an external power supply; a switching unit that converts power received from the smoothing unit into the driving power of a motor through a switching operation to output the converted power to the motor; and a control unit that generates a control signal for controlling a switching operation of the switching unit according to a driving target of the motor to apply the generated control signal to the switching unit, wherein the control unit includes a first processing unit and a second processing unit, and allows the first processing unit to measure a ripple voltage of the smoothing unit based on a detection result of detecting the voltage and current of the driving power so as to determine a switching frequency of the switching unit according to the measurement result, and allows either one of the first processing unit and the second processing unit to generate the control signal according to the determination result so as to apply the generated control signal to the switching unit.

In addition, an embodiment of a motor control system according to the present disclosure having the above technical features as a problem solving means may include a motor that drives a compressor; a smoothing unit that smooths power received from an external power supply; a switching unit provided with a plurality of switching elements to convert power received from the smoothing unit into the driving power of the motor through a switching operation of the switching elements so as to output the converted driving power to the motor; and a control unit that controls the switching operation of the switching unit according to a driving target of the motor to control the driving of the motor, wherein the control unit includes a first processing unit that measures a ripple voltage of the smoothing unit based on a detection result of detecting the voltage and current of the driving power, and determines a switching frequency of the switching unit according to the measurement result, but controls the switching operation of the switching unit according to the switching frequency when the switching frequency corresponds to a preset first reference; and a second processing unit that controls the switching operation of the switching unit according to the switching frequency when the switching frequency corresponds to a preset second reference.

Moreover, an embodiment of a motor control method according to the present disclosure having the above technical features as a problem solving means may include a smoothing unit that smooths power received from an external power supply; a switching unit that converts power received from the smoothing unit into the driving power of a motor through a switching operation to output the converted power to the motor; and a control unit provided with a first processing unit and a second processing unit to control a switching operation of the switching unit according to a driving target of the motor, wherein the motor control method includes allowing the first processing unit to detect the voltage and current of the driving power; measuring a ripple voltage of the smoothing unit based on the detection result; determining a switching frequency of the switching unit based on the measurement result and a preset ripple reference; and allowing either one of the first processing unit and the second processing unit to control a switching operation of the switching unit according to the determination result.

A motor control device, a motor control system, and a motor control method according to the present disclosure as described above may be applied to and implemented for a control device for controlling a motor of a compressor, a compressor control device, a compressor control device provided in a compressor, such as an inverter device for controlling a motor of the compressor, a compressor including the same, or a control method of such a compressor. However, technologies disclosed herein are not limited thereto, and may also be applicable to any motor control device, motor control system and motor control method to which the technical concept of the present disclosure is applicable.

A motor control device, a motor control system, and a motor control method according to the present disclosure may determine an appropriate switching frequency according to a ripple voltage of a DC link capacitor, and control a switching operation according to the determined switching frequency, thereby having an effect of carrying out switching operation control according to the ripple voltage of the DC link capacitor.

Specifically, the switching operation of a switching unit may be controlled according to an appropriate switching frequency capable of limiting the ripple voltage, thereby having an effect of limiting the ripple voltage of the DC link capacitor and carrying out appropriate switching operation control suitable for driving the motor.

Furthermore, a motor control device, a motor control system, and a motor control method according to the present disclosure may determine an appropriate switching frequency according to a ripple voltage of a DC link capacitor, and control a switching operation of a switching unit by selectively performing computational processing for controlling the switching operation according to the determined switching frequency through a plurality of computational processing elements, thereby having an effect or efficiently performing computational processing for high-speed switching and switching variation.

Specifically, an MCU may control a switching operation when low-speed switching is required, and an FPGA, which has a faster computational processing speed than the MCU, may control the switching operation when high-speed switching is required, thereby having an effect of quickly and appropriately carrying out switching control to an appropriate switching frequency according to a ripple voltage.

In addition, a motor control device, a motor control system, and a motor control method according to the present disclosure may control a switching operation of a switching unit by selectively performing a plurality of computational processing elements to divide the computational processing of the computational processing elements, thereby having an effect of increasing the usability and lifespan of each of the computational processing elements.

Specifically, when low-speed switching is required, an MCU may control a switching operation to prevent excessive computational processing of an FPGA, and accordingly reduce the unnecessary computational amount of the FPGA, thereby having an effect of increasing the lifespan of the FPGA as well as increasing the usability of the MCU.

Due to these effects, a motor control device, a motor control system, and a motor control method according to the present disclosure may have an effect of carrying out adequate, appropriate, reliable, usable, efficient and effective motor control in a field requiring high-speed switching control due to frequent high-speed operation.

As a result, a motor control device, a motor control system, and a motor control method according to the present disclosure may have an effect of improving the limitation of the related art, as well as increasing the stability and applicability of a motor control technology field.

DETAILED DESCRIPTION OF THE EMBODIMENTS

Figure 1:
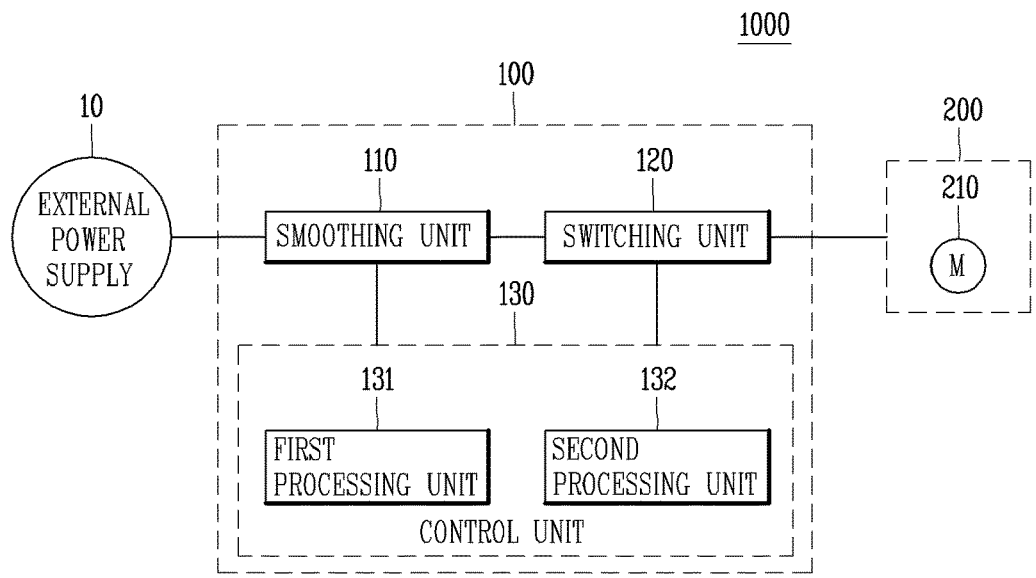
FIG. 1 is a block diagram showing a configuration of a motor control device and a motor control system according to the present disclosure.

The technologies disclosed herein may be applicable to a motor control device, a motor control system, and a control method of the motor control device. In particular, they may be usefully applicable to a device for controlling a motor of a vehicle compressor requiring high-speed driving and high-speed switching control, a device for controlling a vehicle compressor, a system and method for controlling a motor of a vehicle compressor, and a system and method for controlling a vehicle compressor. However, the invention disclosed herein is not limited thereto, and may also be applicable to any existing motor control device, motor driving device, inverter device for controlling a motor, method for controlling a motor control device, method for controlling an inverter device, control member for controlling a motor control device and control methods thereof, control device for controlling a motor control device and control method thereof, control device for controlling an inverter device, and control method thereof to which the technical concept of the present disclosure is applicable.

Hereinafter, the embodiments disclosed herein will be described in detail with reference to the accompanying drawings, and the same or similar elements are designated with the same numeral references regardless of the numerals in the drawings and their redundant description will be omitted. In describing an embodiment disclosed herein, moreover, the detailed description will be omitted when specific description for publicly known technologies to which the invention pertains is judged to obscure the gist of the present disclosure.

Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

First, a motor control device (hereinafter, referred to as a control device) according to the present disclosure will be described.

The control device denotes a control device that controls the driving of a compressor.

The control device denotes a control device that controls the driving of a motor of a compressor.

The control device may be a control device for supplying driving power to the motor of the compressor to control the driving of the compressor.

The control device may be a device for controlling the motor using an inverter method.

In other words, the control device may be an inverter that controls the driving of the compressor, or a device including the inverter.

The control device may control the driving power applied to the motor to control the driving of the motor, thereby controlling the driving of the compressor.

As shown in FIG. 1, the control device 100 includes a smoothing unit 110 that receives power from an external power supply 10 to smooth the received power, a switching unit 120 that converts power received from the smoothing unit 110 into the driving power of a motor 210 through a switching operation to output the converted power to the motor 210, and a control unit 130 that generates a control signal for controlling the switching operation of the switching unit 120 according to the driving target of the motor 210 to apply the generated control signal to the switching unit 120.

In other words, the control device 100 includes the smoothing unit 110, the switching unit 120, and the control unit 130 to control the driving of the motor 210 through the smoothing unit 110, the switching unit 120, and the control unit 130.

In the control device 100, the control unit 130 may generate the control signal according to the driving target to apply it to the switching unit 120, and the switching unit 120 may perform a switching operation according to the control signal to output the driving power to the motor 210, thereby controlling the driving of the motor 210.

In other words, the control device 100 may allow the control unit 130 to control the switching operation of the switching unit 120 through the control signal so as to control the driving power applied to the motor 210, thereby controlling the driving of the motor 210.

In the control device 100, the control unit 130 includes a first processing unit 131 and a second processing unit 132.

Here, the first processing unit 131 and the second processing unit 132 denote an computational processing member that performs a computation for controlling the switching operation of the switching unit 120 to generate the control signal.

The control unit 130 including the first processing unit 131 and the second processing unit 132 to perform computational processing for controlling the switching operation of the switching unit 120 measures a ripple voltage of the smoothing unit 110 based on a detection result of detecting the voltage and current of the driving power at the first processing unit 131 to determine a switching frequency of the switching unit 120 according to the measurement result, and generates the control signal from either one of the first processing unit 131 and the second processing unit 132 according to the determination result to apply it to the switching unit 120.

In other words, the control device 100 measures the ripple voltage of the smoothing unit 110 based on a detection result of the first processing unit 131 that has detected the voltage and current of the driving power to determine the switching frequency of the switching unit 120 according to the measurement result, and allows either one of the first processing unit 131 and the second processing units 132 to selectively control the switching unit 120 so as to control the motor 210.

The control device 100 may be disposed on one or more substrates.

The control device 100 may be defined in a configuration in which a plurality of circuit elements constituting each of the smoothing unit 110, the switching unit 120, and the control unit 130 are disposed on one or more substrates.

Figure 2:
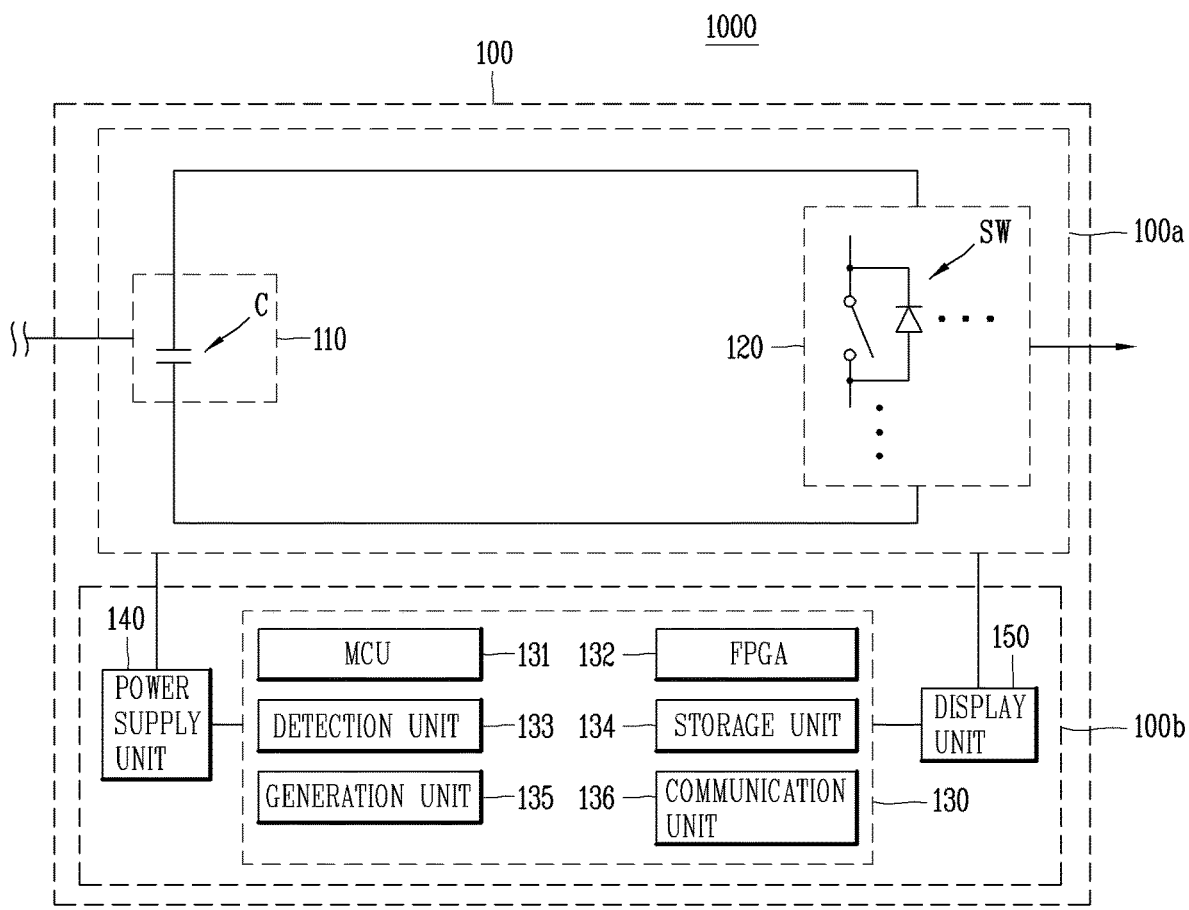
FIG. 2 is a block diagram showing a specific configuration of the motor control device and the motor control system as shown in FIG. 1.

A specific configuration of the control device 100 may be as shown in FIG. 2.

The control device 100 may include a conversion circuit unit 100*a* that convers power and a control circuit unit 100*b* that performs overall functions of the control device 100 or controls an operation.

The conversion circuit unit 100*a* may be a power conversion circuit that converts power in the control device 100.

The conversion circuit unit 100*a* may include a plurality of circuit elements to convert power through the plurality of circuit elements.

The conversion circuit unit 100*a* may also be configured to include a plurality of power conversion circuits or power conversion devices.

For instance, it may include at least one of a converter unit that converts AC power to DC power or an inverter unit that converts DC power to AC power.

The conversion circuit unit 100*a* may include the smoothing unit 110 and the switching unit 120.

The smoothing unit 110 may receive power from the external power supply 10 to smooth the input power to direct current.

Here, the external power supply 10 may denote a battery, a commercial power supply, or another power supply device.

The external power supply 10 may be a power supply that supplies DC power to the control device 100.

The external power supply 10 may also be a power supply that supplies AC power to the control device 100.

When the external power supply 10 is a power supply that supplies AC power, the conversion circuit unit 100*a* may further include a rectifier unit (not shown) that rectifies AC power input from the external power supply 10 to DC power.

In this case, the rectifier unit may be disposed at a front end of the smoothing unit 110 to transfer rectified DC power to the smoothing unit 110.

The smoothing unit 110 may be a DC link capacitor that smooths and stores DC power.

The smoothing unit 110 may include a capacitor having excellent temperature characteristics with a high operating voltage above a predetermined reference voltage.

The smoothing part 110 may preferably include a film capacitor.

The smoothing unit 110 may smooth and store power input to the conversion circuit unit 100*a* from the external power supply 10 as DC power, and transfer the smoothed DC power to the switching unit 120.

The switching unit 120 may convert power received from the smoothing unit 110 into the driving power through a switching operation to output the converted power to the motor 210.

The switching unit 120 may include a plurality of switching elements (SWs) configured to receive the smoothed DC power from the smoothing unit 110, convert the DC power into the driving power through a switching operation, and output the driving power to the motor 210.

The switching elements (SWs) included in the switching unit 120 may be preferably insulated gate bipolar transistors (IGBTs).

The switching unit 120 may include a plurality of switching elements (SWs) to constitute an inverter circuit.

The switching elements (SWs) may be provided according to the phases of the driving power.

For example, when the driving power applied to the motor 210 is to three phases, three pairs of switching elements, that is, six switching elements, may be provided.

The switching unit 120 may be controlled and operated by the control unit 130.

The switching unit 120 may perform a switching operation by the control signal generated by the control unit 130.

The control circuit unit 100*b* may be a control circuit that performs functions and controls in the control device 100.

The control circuit unit 100*b* may include a plurality of circuit elements to perform functions and controls through the plurality of circuit elements.

The control circuit unit 100*b* may also include a plurality of circuit modules or circuits configured to implement a specific function.

For instance, it may include at least one of a computation member, a signal processing member, a control member, a communication member, a power supply member, and a display member.

The control circuit unit 100*b* may include the control unit 130, a power supply unit 140, and a display unit 150.

The control unit 130 may be a control module that generates a control signal for controlling the switching operation of the switching unit 120 according to a driving target of the motor 210 to apply it to the switching unit 120, thereby controlling the switching operation of the switching unit 120.

Here, the driving target may denote a driving command of the motor 210.

For instance, it may be a driving command for at least one of the speed, torque, switching frequency, driving voltage, and driving current of the motor 210.

Accordingly, the control unit 130 may generate and apply the control signal to the switching unit 120 to drive the motor 210 according to the driving target.

The control unit 130 may control a switching operation of the switching unit 120 according to the driving target to control the conversion and output of the driving power, thereby performing the driving control of the motor 210.

The control unit 130 may include a plurality of modules to control the switching operation of the switching unit 120 to control the conversion and output of the driving power.

The control unit 130 may include the first processing unit 131 and the second processing unit 132, and further include at least one of a detection unit 133, a storage unit 134, a generation unit 135, and a communication unit 136 to control the switching operation so as to control the conversion and output of the driving power, thereby performing the driving control of the motor 210.

The first processing unit 131 and the second processing unit 132 may be modules that calculate and process information processed by the control unit 130.

For instance, a computation for controlling the switching operation of the switching unit 120 may be performed to generate the control signal according to a result of the operation.

The first processing unit 131 and the second processing unit 132 may be composed of different types of operation processing modules.

The first processing unit 131 may preferably be a micro controller unit (MCU) that performs a computation process for performing one or more functions.

In addition, the second processing unit 132 may preferably be a field programmable gate array (FPGA) including designable logic elements and programmable internal lines.

The detection unit 133 may be a module that detects an operation result according to the switching operation of the switching unit 120.

For instance, one or more of the voltage and current of the driving power applied to the motor 210, the switching frequency of the switching unit 120, and the voltage of the smoothing unit 110 may be detected.

The storage unit 134 may be a module that stores information processed by the control unit 130.

For instance, the device information of the switching elements (SWs) included in the switching unit 120 may be stored therein.

The generation unit 135 may be a module that generates and processes a signal generated by the control unit 130.

For example, a signal for controlling the display unit 150 may be generated.

The communication unit 136 may be a communication module that performs communication with another device that communicates with the compressor 200.

The communication unit 136 may perform data transmission/reception with the another device to perform communication.

For instance, data may be received from an upper control member of the control device 100 or data may be transmitted to the upper control member.

The power supply unit 140 may be a power supply member that supplies power to the switching unit 120, the control unit 130, and the display unit 150, respectively, to operate the control device 100.

The power supply unit 140 converts power supplied from the outside into power for operating the switching unit 120, the control unit 130, and the display unit 150, respectively, to supply operating power to the switching unit 120, the control unit 130, and the display unit 150, respectively.

For example, DC power at 12V supplied from the outside may be converted into first to third powers having different voltage levels to supply the first power to the first processing unit 131 and the second processing unit 132, the second power to the generation unit 134, and the third power to the communication unit 136.

The power supply unit 140 may include a switched mode power supply (SMPS) to supply power to the switching unit 120, the control unit 130, and the display unit 150, respectively.

The display unit 150 may be a display member that externally displays the status information of the compressor 200 and the motor 210.

The display unit 150 may be a display device provided in the compressor 200 or a display device separated from the compressor 200.

The display unit 150 may be controlled by the control unit 130 to display the status information of the compressor 200 on a screen displayed externally.

The state information of the compressor 200 may also be displayed on a display unit in a device separated from the compressor 200 to monitor the driving state of the compressor 200.

Figure 3:
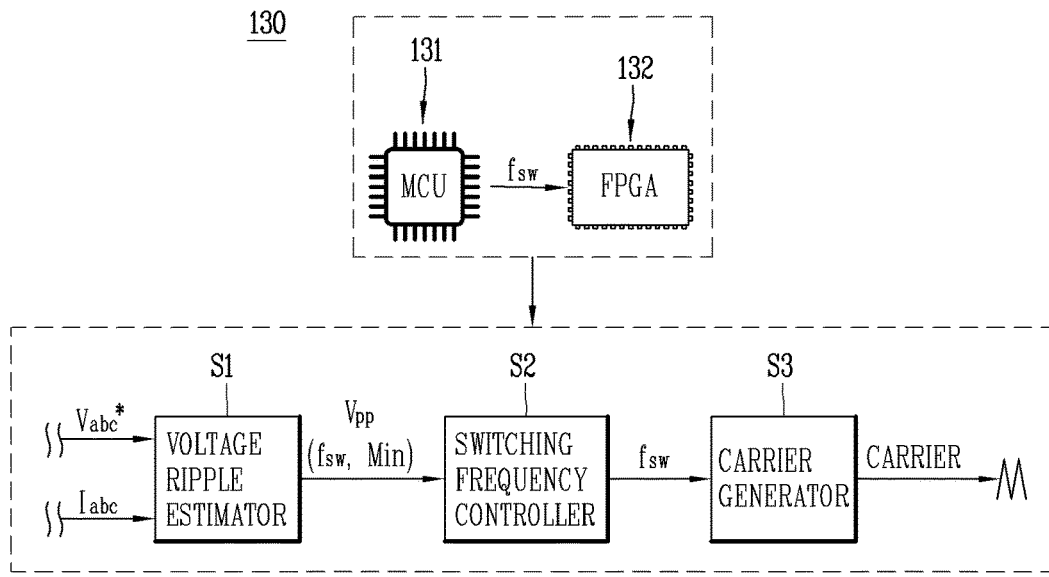
FIG. 3 is a block diagram showing an operation process for controlling a switching operation of a controller in the motor control device according to the present disclosure.

A specific computation process for controlling the switching operation of the switching unit 120 by the control device 100 having the foregoing configuration may be as shown in FIG. 3.

As shown in FIG. 3, in the control device 100, the first processing unit 131 and the second processing unit 132 included in the control unit 130 may measure the ripple voltage of the smoothing unit 110 (S1), determine the switching frequency according to the ripple voltage (S2), and perform a computation process for generating the control signal (S3) according to the determined switching frequency, thereby control the switching operation of the switching unit 120.

Figure 4:
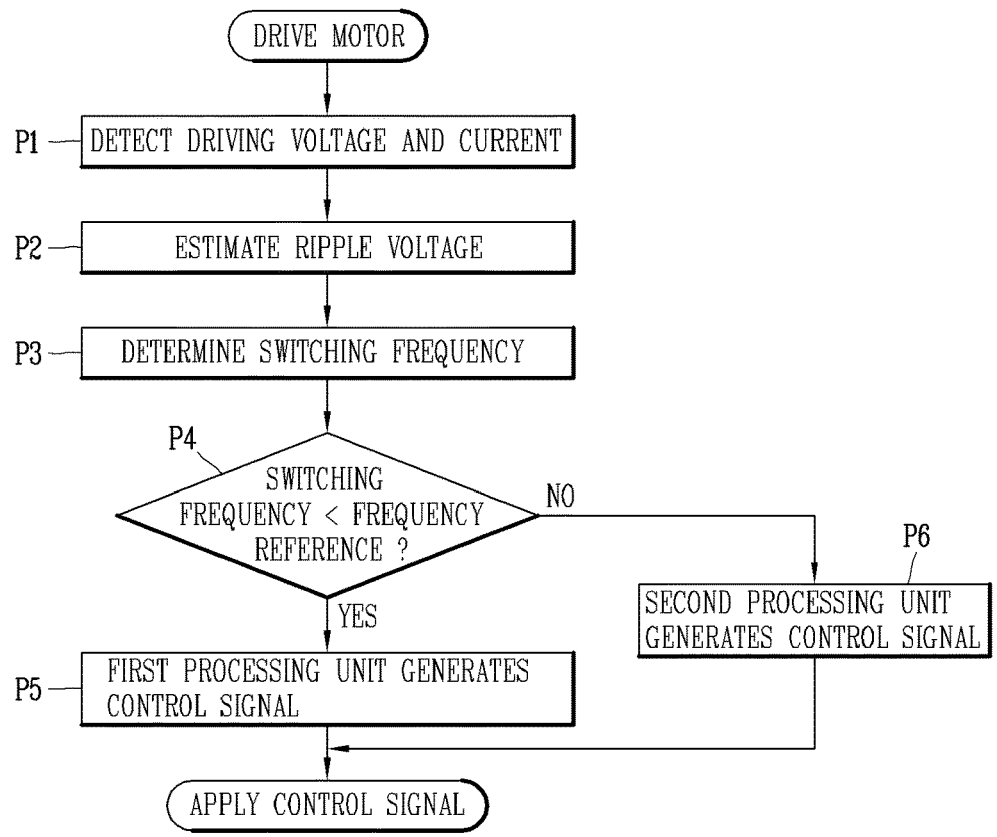
FIG. 4 is a flowchart showing a motor control process of the motor control device according to the present disclosure.

The control unit 130 that generates the control signal through such a computation process may control the driving of the motor 210 through a control process as shown in FIG. 4.

In the control unit 130, as shown in FIG. 4, the first processing unit 131 may detect the voltage and current of the driving power (P1), and measure the ripple voltage of the smoothing unit 110 based on the detection result (P2) to determine the switching frequency of the switching unit 120 according to the measurement result (P3), and either one of the first processing unit 131 and the second processing unit 132 may generate the control signal (P4 to P6) and apply it to the switching unit 120, and the switching unit 120 may perform a switching operation according to the control signal to output the driving power to the motor 210, thereby controlling the driving of the motor 210.

In other words, in the control unit 130, either one of the first processing unit 131 and the second processing unit 132 may control the driving of the motor 210 according to the switching frequency determined by the first processing unit 131.

For instance, either one of the first processing unit 130 and the second processing unit 132 may selectively control the driving of the motor 210 according to the magnitude of the switching frequency.

The control unit 130 may detect a voltage level and a current level of the driving power applied to the motor 210, respectively (P1).

The control unit 130 may detect the voltage and current of the driving power (P1), and compute at least one of a power factor of the driving power, a phase of the voltage, and a phase difference between the voltage and current of the driving power based on the detection result, and measure the ripple voltage based on the computation result (P2).

The ripple voltage may denote a voltage having an AC component included in a power source smoothed by the smoothing unit 110.

The control unit 130 may measure the ripple voltage based on the detection result (P2), and determine an appropriate frequency of the switching frequency according to the ripple voltage.

The control unit 130 may determine the switching frequency according to the ripple voltage based on a preset ripple reference (P3).

The ripple reference may be a reference for an appropriate frequency of the switching frequency according to the ripple voltage.

The ripple reference may be a reference set by tabulating an appropriate frequency of the switching frequency according to the ripple voltage.

For instance, the ripple reference may be a reference in which appropriate frequency values for each of a plurality of ripple voltage values are tabulated into data.

The appropriate frequency may denote a frequency at which the ripple voltage is limited to a predetermined reference.

In other words, the control unit 130 may determine an appropriate frequency at which the ripple voltage is limited to a predetermined reference as a switching frequency of the switching unit 120.

The control unit 130 may determine a frequency corresponding to the ripple voltage among the ripple references as the switching frequency (P3), and compare the determined switching frequency with a preset frequency reference (P4), to allow the first processing unit 131 to generate the control signal (P5), or allow the second processing unit 132 to generate the control signal (P6) and apply it to the switching unit 120.

The frequency reference may be any one of the switching frequencies of the switching unit 210 for controlling the driving of the motor 210.

Figure 5:
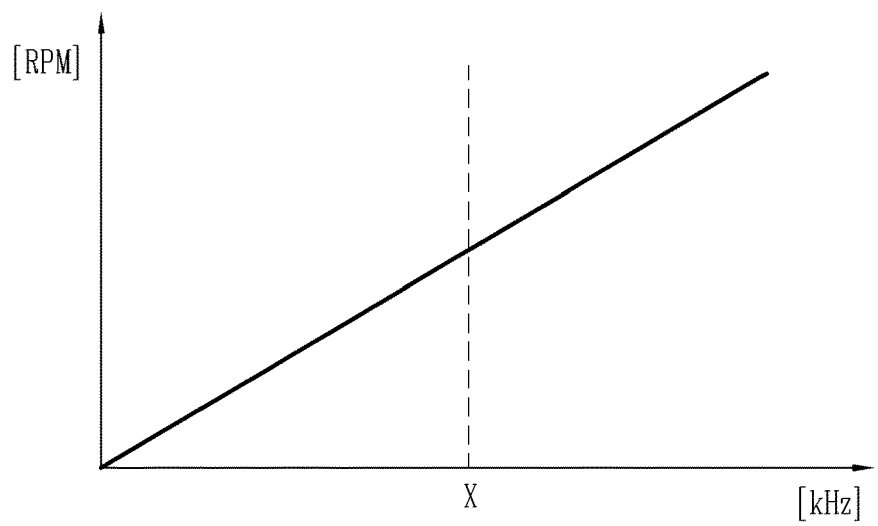
FIG. 5 is a graph showing an example of a frequency reference according to an embodiment of the motor control device according to the present disclosure.

For instance, as shown in FIG. 5, a frequency x [KHZ] within a frequency range in which the switching unit 210 performs a switching operation may be set based on the frequency reference.

The frequency reference may be a minimum frequency value among switching frequencies when the motor 210 operates in a high-speed operation region.

In other words, the frequency reference may be a frequency value corresponding to a boundary between the low-speed and high-speed operation of the motor 210.

The frequency reference may also be a frequency value corresponding to a boundary reference between low-speed switching and high-speed switching of the switching unit 120.

The frequency reference may be preferably set to any one of frequency values of 15 to 20 [KHZ].

The frequency reference may also be a predetermined frequency range based on any one of the switching frequencies of the switching unit 210 for controlling the driving of the motor 210.

As a result of comparing the switching frequency with the frequency reference (P4), the control unit 130 may allow the first processing unit 131 to generate the control signal and apply it to the switching unit (P5) when the switching frequency is less than the frequency reference.

As a result of comparing the switching frequency with the frequency reference (P4), the control unit 130 may allow the second processing unit 132 to generate the control signal and apply it to the switching unit (P6) when the switching frequency is above the frequency reference.

In other words, the control unit 130 may allow the first processing unit 131 to control the switching operation of the switching unit 120 when the switching frequency determined according to the ripple voltage is less than the frequency reference, and allow the second processing unit 132 to control the switching operation of the switching unit 120 when the switching frequency is above the frequency reference.

Accordingly, the control unit 130 may allow the first processing unit 131 to control the switching operation of the switching unit 120 from 0 to x [KHZ] which is the frequency reference corresponding to a low speed switching section, on a switching frequency graph as shown in FIG. 5, and allow the second processing unit 132 to control the switching operation of the switching unit 120 above x [KHZ] corresponding to a high-speed switching section.

In other words, the control unit 130 may allow the first processing unit 131 composed of an MCU to control the switching operation of the switching unit 120 at low speed in a low-speed switching section in which the motor 210 operates in a low-speed operation region, and allow the second processing unit 132 composed of an FPGA to control the switching operation of the switching unit 120 at high speed in a high-speed switching section in which the motor 210 operates in a high-speed operation region.

As described above, the first processing unit 131 may be allowed to control when the switching operation of the switching unit 120 is controlled at low speed, and the second processing unit 132, which has a higher computational processing speed than the first processing unit 132, may be allowed to control when the switching operation of the switching unit 120 is controlled at high speed, thereby performing an appropriate operation processing according to the switching frequency and generating the control signal.

Figure 6A:
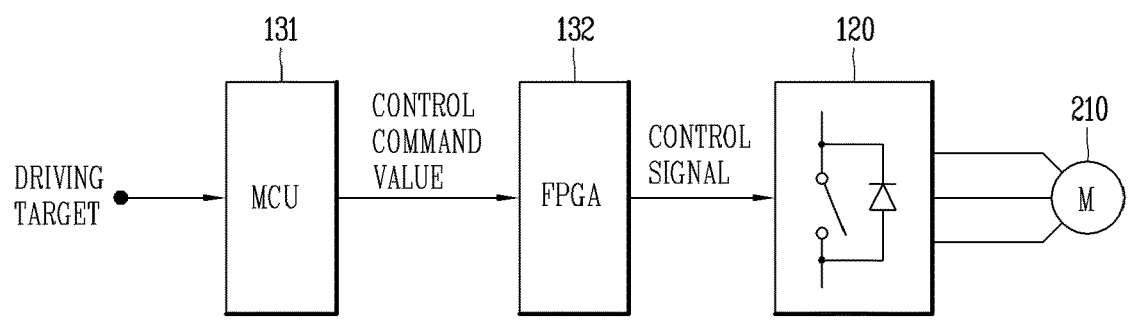
FIG. 6A is an exemplary view showing a control example of a first processing unit according to an embodiment of the motor control device according to the present disclosure.
Figure 6B:
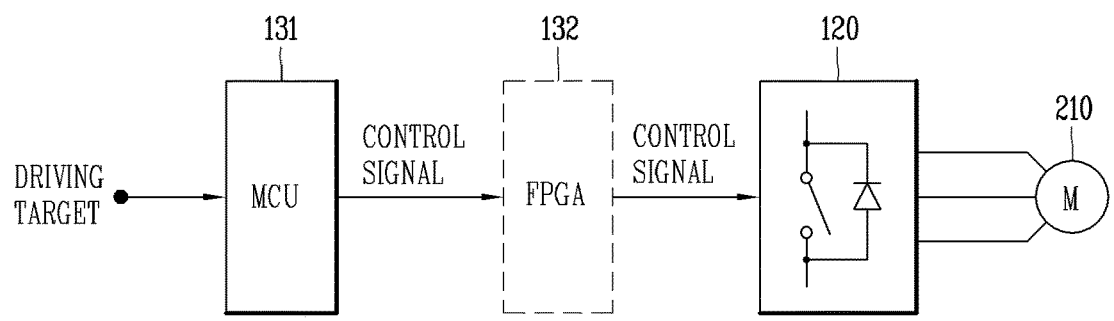
FIG. 6B is an exemplary view showing a control example of a second processing unit according to an embodiment of the motor control device according to the present disclosure.

The control unit 130 may allow the first processing unit 131 to generate the control signal and apply it to the switching unit 120 to control the driving of the motor 210, as shown in FIG. 6A, when the switching frequency is less than the frequency reference, and allow the second processing unit 132 to generate the control signal and apply it to the switching unit 120 to control the driving of the motor 210, as shown in FIG. 6B, when the switching frequency is above the frequency reference.

When either one of the first processing unit 131 and the second processing unit 132 generates the control signal, the control unit 130 may generate the control signal to allow the switching unit 120 to operate according to the switching frequency.

In other words, the control unit 130 may generate a control signal for allowing the switching unit 120 to perform a switching operation according to the switching frequency, thereby controlling the switching unit 120 to operate at the switching frequency.

When the switching frequency is less than the frequency reference, the first processing unit 131 may generate the control signal and apply it to the switching unit 120.

When generating the control signal, the first processing unit 131 may compute a control command value according to the switching frequency, and generate the control signal according to the computation result to apply it to the switching unit 120.

The control command value may denote a command value of a driving current that controls the switching unit 120 to operate according to the switching frequency.

Figure 7:
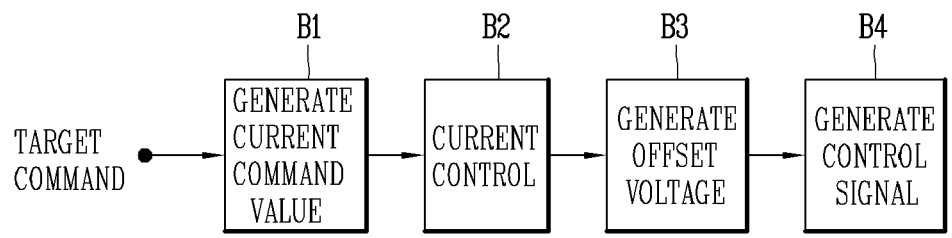
FIG. 7 is a block diagram showing a process of generating a control signal according to a switching frequency according to an embodiment of the motor control device according to the present disclosure.

When generating the control signal, as shown in FIG. 7, the first processing unit 131 may compute (generate) a current command value according to the switching frequency using the switching frequency as a target command (B1), and control a driving current according to the current command value (B2) to compute (generate) an offset voltage according to the control result (B3), and generate the control signal according to the operation result (B4) to apply it to the switching unit 120, thereby controlling the switching operation of the switching unit 120 according to the switching frequency.

When the first processing unit 131 applies the control signal to the switching unit 120, the second processing unit 132 may allow the control signal to be bypassed such that the control signal is bypassed to the switching unit 120.

In other words, when the first processing unit 131 applies the control signal to the switching unit 120, as shown in FIG. 6A, the first processing unit 131 may transfer the control signal to the second processing unit 132, but the second processing unit 132 bypasses the control signal to the switching unit 120, thereby allowing the control signal to be applied to the switching unit 120.

When the switching frequency is above the frequency reference, the second processing unit 132 may generate the control signal and apply it to the switching unit 120.

When generating the control signal, the second processing unit 132 may generate the control signal according to a result of computing the control command value by the first processing unit 131 and apply it to the switching unit 120.

When the second processing unit 132 generates the control signal, the first processing unit 131 may compute the control command value according to the switching frequency to transfer the computation result to the second processing unit 132, and the second processing unit 132 may generate the control signal according to the computation result received from the first processing unit 131 to apply it to the switching unit 120.

In other words, when the second processing unit 132 generates the control signal, as shown in FIG. 6B, the first processing unit 131 may transfer a result of computing the control command value to the second processing unit 132, and the second processing unit 132 may generate the control signal according to the computation result to apply it to the switching unit 120, thereby allowing the second processing unit 132 to control the switching operation of the switching unit 120.

In this case, as shown in FIG. 7, the first processing unit 131 may compute (generate) the current command value (B1) to transfer it to the second processing unit 132, and the second processing unit 132 may control a driving current value according to the current command value (B2) to compute (generate) an offset voltage according to the control result (B3), and generate the control signal according to the computation result (B4) to apply it to the switching unit 120, thereby controlling the switching operation of the switching unit 120 according to the switching frequency.

As described above, the control device 100 may control the switching operation of the switching unit 120 to allow the switching unit 120 to perform a switching operation at an appropriate frequency at which the ripple voltage is limited, but allow the first processing unit 131 to control the switching operation of the switching unit 120 when the switching frequency corresponds to low-speed switching, and allow the second processing unit 132 to control the switching operation of the switching unit 120 when the switching frequency corresponds to high-speed switching, thereby allowing the switching unit 120 to perform a switching operation according to an appropriate frequency at which the ripple voltage is limited as well as performing appropriate and efficient switching control according to the switching speed of the switching unit 120.

Hereinafter, a motor control system (hereinafter, referred to as a system) according to the present disclosure will be described, and its redundant described above in the control device 100 will be omitted as much as possible.

The system may include the control device 100 described above.

The system may be a system for controlling the motor 210 including the control device 100 described above.

The system may be a system that controls driving power applied to the motor 210 to apply it to the motor 210, thereby controlling the driving of the motor 210.

The system may be any type of control device or system that controls the driving and operation of the motor, and for example, a device that controls the motor, a drive device that controls the driving of the motor, or a control system of a device that controls the driving of motor, or a system including the same.

As shown in FIG. 1, the system 1000 includes a motor 210 that drives a compressor 200, a smoothing unit 110 that smooths power input from an external power supply 10, a switching unit 120 provided with a plurality of switching elements to convert power received from the smoothing unit 110 through the switching operation of the switching elements into the driving power of the motor 210 and output the converted power to the motor 210, and a control unit 130 that controls the switching operation of the switching unit 120 according to a driving target of the motor 210 to control the driving of the motor 210.

In the system 1000, the control unit 130 measures the ripple voltage of the smoothing unit 110 based on a detection result of detecting the voltage and current of the driving power, and determines the switching frequency of the switching unit 120 according to the measurement result, but includes the first processing unit 131 that controls the switching operation of the switching unit 120 according to the switching frequency when the switching frequency corresponds to a preset first reference, and the second processing unit 132 that controls the switching operation of the switching unit 120 according to the switching frequency when the switching frequency corresponds to a preset second reference.

In other words, the system 1000 measures the ripple voltage of the smoothing unit 110 based on a detection result of the first processing unit 131 that has detected the voltage and current of the driving power to determine the switching frequency of the switching unit 120 according to the measurement result, and allows either one of the first processing unit 131 and the second processing units 132 to selectively control the switching unit 120 so as to control the motor 210.

In the system 1000, the smoothing unit 110, the switching unit 120, and the control unit 130 may constitute the control device 100 described above.

In other words, the system 1000 may be a system including the motor 210 and the control device 100 to control the driving of the motor 210.

A specific configuration of the control device 100 including the smoothing unit 110, the switching unit 120 and the control unit 130 may be as illustrated in FIG. 2.

The control device 100 as shown in FIG. 2 may be disposed on one or more substrates.

The control device 100 may be defined in a configuration in which a plurality of circuit elements constituting each of the smoothing unit 110, the switching unit 120, and the control unit 130 are disposed on one or more substrates.

The smoothing unit 110 may receive power from the external power supply 10 to smooth the input power to direct current.

Here, the external power supply 10 may denote a battery, a commercial power supply, or another power supply device.

The smoothing unit 110 may be a DC link capacitor that smooths and stores DC power.

The smoothing unit 110 may include a capacitor having excellent temperature characteristics with a high operating voltage above a predetermined reference voltage.

The smoothing part 110 may preferably include a film capacitor.

The smoothing unit 110 may smooth and store power received from the external power supply 10 as DC power, and transfer the smoothed DC power to the switching unit 120.

The switching unit 120 may convert power received from the smoothing unit 110 into the driving power through a switching operation to output the converted power to the motor 210.

The switching unit 120 may include the plurality of switching elements (SWs) configured to receive the smoothed DC power from the smoothing unit 110, convert the DC power into the driving power through a switching operation, and output the driving power to the motor 210.

The switching elements (SWs) included in the switching unit 120 may be preferably insulated gate bipolar transistors (IGBTs).

When the driving power applied to the motor 210 is three phases, the switching elements (SWs) may include three pairs of switching elements, that is, six switching elements.

The switching unit 120 may be controlled and operated by the control unit 130.

The switching unit 120 may perform a switching operation by the control signal generated by the control unit 130.

The control unit 130 may be a control module that generates a control signal for controlling the switching operation of the switching unit 120 according to a driving target of the motor 210 to apply it to the switching unit 120, thereby controlling the switching operation of the switching unit 120.

Here, the driving target may be a driving command for at least one of the speed, torque, switching frequency, driving voltage, and driving current of the motor 210.

The control unit 130 may control a switching operation of the switching unit 120 according to the driving target to control the conversion and output of the driving power, thereby performing the driving control of the motor 210.

The control unit 130 may include a plurality of modules to control the switching operation of the switching unit 120 to control the conversion and output of the driving power.

The control unit 130 may include the first processing unit 131 and the second processing unit 132, and further include at least one of a detection unit 133, a storage unit 134, a generation unit 135, and a communication unit 136 to control the switching operation so as to control the conversion and output of the driving power, thereby performing the driving control of the motor 210.

The first processing unit 131 and the second processing unit 132 may be modules that calculate and process information processed by the control unit 130.

The first processing unit 131 may preferably be a micro controller unit (MCU) that performs a computation process for performing one or more functions.

In addition, the second processing unit 132 may preferably be a field programmable gate array (FPGA) including designable logic elements and programmable internal lines.

The detection unit 133 may be a module that detects an operation result according to the switching operation of the switching unit 120.

The storage unit 134 may be a module that stores information processed by the control unit 130.

The generation unit 135 may be a module that generates and processes a signal generated by the control unit 130.

The communication unit 136 may be a communication module that performs communication with another device that communicates with the compressor 200.

The power supply unit 140 may be a power supply member that supplies power to the switching unit 120, the control unit 130, and the display unit 150, respectively, to operate the control device 100.

The power supply unit 140 may include a switched mode power supply (SMPS) to supply power to the switching unit 120, the control unit 130, and the display unit 150, respectively.

The display unit 150 may be a display member that externally displays the status information of the compressor 200 and the motor 210.

The display unit 150 may be controlled by the control unit 130 to display the status information of the compressor 200 on a screen displayed externally.

In the control device 100 configured as described above, the first processing unit 131 may measure the ripple voltage of the smoothing unit 110, and determine the switching frequency according to the ripple voltage to allow either one of the first processing unit 131 and the second processing unit 132 to perform a computation process of generating the control signal, thereby controlling the switching operation of the switching unit 120.

The control unit 130 may allow the first processing unit 131 to detect the voltage and current of the driving power, and measure the ripple voltage of the smoothing unit 110 based on the detection result to determine the switching frequency of the switching unit 120 according to the measurement result, and allow either one of the first processing unit 131 and the second processing units 132 to generate the control signal to apply it to the switching unit 120.

Accordingly, the switching unit 120 performs a switching operation according to the control signal to output the driving power to the motor 210, thereby controlling the driving of the motor 210.

The first processing unit 131 may detect a voltage level and a current level of the driving power applied to the motor 210, respectively.

The first processing unit 131 may detect the voltage and current of the driving power, and compute at least one of a power factor of the driving power, a phase of the voltage, and a phase difference between the voltage and current of the driving power based on the detection result, and measure the ripple voltage based on the computation result.

The first processing unit 131 may measure the ripple voltage based on the detection result, and determine an appropriate frequency of the switching frequency according to the ripple voltage.

The first processing unit 131 may determine the switching frequency according to the ripple voltage based on a preset ripple reference.

The ripple reference may be a reference for an appropriate frequency of the switching frequency according to the ripple voltage.

The first processing unit 131 may operate to determine a frequency corresponding to the ripple voltage as the switching frequency among the ripple references, and generate the control signal according to whether the determined switching frequency corresponds to the first reference or the second reference or operate to allow the second processing unit 132 to generate the control signal.

The first and second references may be references for a range of the switching frequency.

The first reference and the second reference may be references in which the range is divided based on either one of the switching frequencies of the switching unit 210 for controlling the driving of the motor 210.

For instance, as shown in FIG. 5, within a frequency range in which the switching unit 210 performs a switching operation, frequencies less than x [KHZ] frequency are set to a first reference, and frequencies above x [KHZ] frequency are set to a second reference.

The first reference and the second reference may be preferably set based on either one of frequency values between 15 and 20 [KHZ].

For instance, the first reference may be frequencies between 0 and 20 [KHZ], and the second reference may be set to frequencies above 20 [KHZ].

Accordingly, the first reference may be set to a reference corresponding to low-speed switching frequencies, and the second reference may be set a reference corresponding to high-speed switching frequencies.

When the switching frequency corresponds to the first reference, the control unit 130 may allow the first processing unit 131 to generate a control signal for controlling the switching operation of the switching unit 120 and apply it to the switching unit 120.

When the switching frequency corresponds to the second reference, the control unit 130 may allow the second processing unit 132 to generate a control signal for controlling the switching operation of the switching unit 120 and apply it to the switching unit 120.

In other words, the control unit 130 may allow the first processing unit 131 to control the switching operation of the switching unit 120 when the switching frequency determined according to the ripple voltage corresponds to the first reference, and allow the second processing unit 132 to control the switching operation of the switching unit 120 when the switching frequency corresponds to the second reference.

Accordingly, the control unit 130 may allow the first processing unit 131 to control the switching operation of the switching unit 120 from 0 to x [KHZ] which is the first reference as a low-speed switching section, on a switching frequency graph as shown in FIG. 5, and allow the second processing unit 132 to control the switching operation of the switching unit 120 above x [KHZ] corresponding to the second reference as a high-speed switching section.

In other words, the control unit 130 may allow the first processing unit 131 composed of an MCU to control the switching operation of the switching unit 120 in a low-speed operation in a low-speed switching section in which the motor 210 operates in a low-speed operation region, and allow the second processing unit 132 composed of an FPGA to control the switching operation of the switching unit 120 in a high-speed operation in a high-speed switching section in which the motor 210 operates in a high-speed operation region.

As described above, the first processing unit 131 may be allowed to control when the switching operation of the switching unit 120 is controlled at low speed, and the second processing unit 132, which has a higher computational processing speed than the first processing unit 132, may be allowed to control when the switching operation of the switching unit 120 is controlled at high speed, thereby performing an appropriate operation processing according to the switching frequency and generating the control signal.

The control unit 130 may allow the first processing unit 131 to generate the control signal and apply it to the switching unit 120 to control the driving of the motor 210, as shown in FIG. 6A, when the switching frequency corresponds to the first reference, and allow the second processing unit 132 to generate the control signal and apply it to the switching unit 120 to control the driving of the motor 210, as shown in FIG. 6B, when the switching frequency corresponds to the second reference.

When either one of the first processing unit 131 and the second processing unit 132 generates the control signal, the control unit 130 may generate the control signal to allow the switching unit 120 to operate according to the switching frequency.

In other words, the control unit 130 may generate a control signal for allowing the switching unit 120 to perform a switching operation according to the switching frequency, thereby controlling the switching unit 120 to operate at the switching frequency.

When the switching frequency corresponds to the first reference, the control unit 130 may allow the first processing unit 131 to compute a control command value according to the switching frequency, and generate a control signal for controlling the switching operation of the switching unit 120 according to the computation result to apply it to the switching unit 120.

In other words, when the switching frequency corresponds to the first reference to generate the control signal, the first processing unit 131 may compute the control command value according to the switching frequency, and generate the control signal according to the computation result to apply it to the switching unit 120.

When the control signal is generated by the first processing unit 131, the second processing unit 132 may receive the control signal from the first processing unit 131 to bypass the control signal to the switching unit 120.

In other words, when the first processing unit 131 applies the control signal to the switching unit 120, as shown in FIG. 6A, the first processing unit 131 may transfer the control signal to the second processing unit 132, but the second processing unit 132 bypasses the control signal to the switching unit 120, thereby allowing the control signal to be applied to the switching unit 120.

When the control signal is generated by the second processing unit 132, the control unit 130 may allow the first processing unit 131 to compute the control command value according to the switching frequency to transfer the computation result to the second processing unit 132, and allow the second processing unit 132 to generate a control signal for controlling the switching operation of the switching unit 120 according to the computation result to apply it to the switching unit 120.

In other words, when the second processing unit 132 generates the control signal since the switching frequency corresponds to the second reference, as shown in FIG. 6B, the first processing unit 131 may compute the control command value to transfer the computation result to to the second processing unit 132, and the second processing unit 132 may generate the control signal according to the computation result to apply it to the switching unit 120.

As described above, in the system 1000, the control device 100 may control the switching operation of the switching unit 120 to allow the switching unit 120 to perform a switching operation at an appropriate frequency at which the ripple voltage is limited, but allow the first processing unit 131 to control the switching operation of the switching unit 120 when the switching frequency corresponds to low-speed switching, and allow the second processing unit 132 to control the switching operation of the switching unit 120 when the switching frequency corresponds to high-speed switching, thereby allowing the switching unit 120 to perform a switching operation according to an appropriate frequency at which the ripple voltage is limited as well as performing appropriate and efficient switching control according to the switching speed of the switching unit 120.

Hereinafter, a motor control method (hereinafter, referred to as a control method) according to the present disclosure will be described, and its redundant described above in the control device 100 and the system 1000 will be omitted as much as possible.

The control method may be a control method of controlling a motor of a compressor.

The control method may be a control method of a control device that controls a motor of a compressor.

In other words, the control method may be a control method applied to the control device 100 or the system 1000 described above.

The control method may be a control method for controlling the motor of the control device 100 or the system 1000 described above.

The control method may be a switching frequency variation control method of varying a switching frequency while driving a motor.

Figure 8:
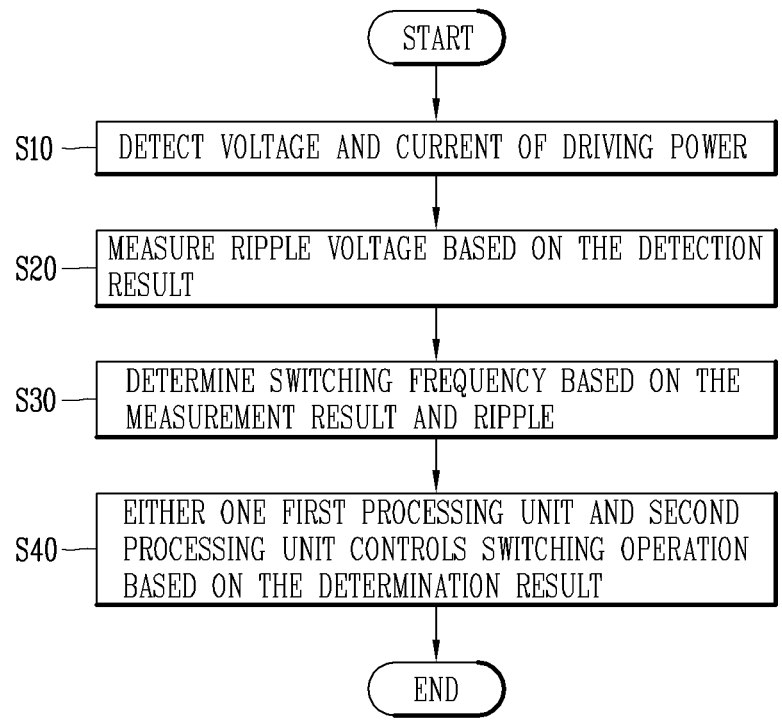
FIG. 8 is a flowchart showing a flow of a compressor control method according to the present disclosure.

The control method is a motor control method of a motor control device including a smoothing unit 110 that smooths power received from an external power supply 10, a switching unit 120 that converts power received from the smoothing unit 110 to the driving power of a motor 210 provided in a compressor 200 through a switching operation to output it to the motor 210, and a control unit 130 provided with a first processing unit 131 and a second processing unit 132 to control the switching operation of the switching unit 120 according to a driving target, as shown in FIG. 1, and includes allowing the first processing unit 131 to detect the voltage and current of the driving power source (S10), measuring the ripple voltage of the smoothing unit 110 based on the detection result (S20), determining a switching frequency of the switching unit 120 based on the measurement result and a preset ripple reference (S30), and allowing either one of the first processing unit 131 and the second processing unit 132 to control the switching operation of the switching unit 120 according to the determination result (S40) as shown in FIG. 8.

In other words, the control device 100 may detect the voltage and current of the driving power supply (S10), and measure the ripple voltage of the smoothing unit 110 based on the detection result (S20), and determine the switching frequency of the switching unit 120 based on the measurement result and a preset reference (S30), and allow either one of the first processing unit 131 and the second processing unit 132 to control the switching operation of the switching unit 120 (S40), and the control method may control the driving of the motor 210 in a sequence as described above.

The control device 100 may also include the control unit 130 to allow the control unit 130 to perform the control method.

In other words, the control method is a method in which the control unit 130 including the first processing unit 131 and the second processing unit 132 controls the driving of the motor 210 in the control device 100.

The smoothing unit 110 may receive power from the external power supply 10 to smooth the input power to direct current.

The smoothing unit 110 may be a DC link capacitor that smooths and stores DC power.

The smoothing part 110 may preferably include a film capacitor.

The smoothing unit 110 may smooth and store power received from the external power supply 10 as DC power, and transfer the smoothed DC power to the switching unit 120.

The switching unit 120 may convert power received from the smoothing unit 110 into the driving power through a switching operation to output the converted power to the motor 210.

The switching unit 120 may include a plurality of switching elements configured to receive the smoothed DC power from the smoothing unit 110, convert the DC power into the driving power through a switching operation, and output the driving power to the motor 210.

The switching elements included in the switching unit 120 may be preferably insulated gate bipolar transistors (IGBTs).

When the driving power applied to the motor 210 is three phases, the switching elements may include three pairs of switching elements, that is, six switching elements.

The switching unit 120 may be controlled and operated by the control unit 130.

The switching unit 120 may perform a switching operation by the control signal generated by the control unit 130.

The control unit 130 may be a control module that generates a control signal for controlling the switching operation of the switching unit 120 according to a driving target of the motor 210 to apply it to the switching unit 120, thereby controlling the switching operation of the switching unit 120.

Here, the driving target may be a driving command for at least one of the speed, torque, switching frequency, driving voltage, and driving current of the motor 210.

The control unit 130 may control a switching operation of the switching unit 120 according to the driving target to control the conversion and output of the driving power, thereby performing the driving control of the motor 210.

The control unit 130 may include a plurality of modules to control the switching operation of the switching unit 120 to control the conversion and output of the driving power.

The control unit 130 including the first processing unit 131 and the second processing unit 132 may control the switching operation to control the conversion and output of the driving power, thereby performing the driving control of the motor 210.

The first processing unit 131 and the second processing unit 132 may be modules that calculate and process information processed by the control unit 130.

The first processing unit 131 may preferably be a micro controller unit (MCU) that performs a computation process for performing one or more functions.

In addition, the second processing unit 132 may preferably be a field programmable gate array (FPGA) including designable logic elements and programmable internal lines.

The control device 100 configured as described above may control the driving of the motor 210 in the steps of allowing the first processing unit 131 to detect the voltage and current of the driving power while the motor 210 is driven (S10), measuring the ripple voltage of the smoothing unit 110 based on the detection result (S20), determining the switching frequency of the switching unit 120 based on the measurement result and a preset ripple reference (S30), and allowing either one of the first processing unit 131 and the second processing unit 132 to control the switching operation of the switching unit 120 (S40).

Said detecting step (S10) may allow the first processing unit 131 to detect the voltage and current of the driving power while the motor 210 is driven.

Said detecting step (S10) may allow the first processing unit 131 to detect the voltage and current of the driving power while the switching unit 120 operates at a switching frequency according to the driving target to apply the driving power to the motor 210.

Said detecting step (S10) may allow the first processing unit 131 to detect the voltage level and current level of the driving power applied to the motor 210, respectively.

Said measuring step (S20) may allow the first processing unit 131 to measure the ripple voltage of the smoothing unit 110 based on the detection result detected in the detection step (S10).

Said measuring step (S20) may allow the first processing unit 131 to compute at least one of a power factor of the driving power, a phase of the voltage, and a phase difference between the voltage and current of the driving power based on the detection result, and measure the ripple voltage based on the computation result.

Said determining step (S30) may allow the first processing unit 131 to determine the switching frequency based on the measurement result measured in the measurement step (S20) and the preset ripple reference.

The ripple reference may be a reference for an appropriate frequency of the switching frequency according to the ripple voltage.

Said determining step (S30) may allow the first processing unit 131 to determine an appropriate frequency of the switching frequency according to the ripple voltage based on the measurement result and the ripple reference.

Said determining step (S30) may allow the first processing unit 131 to determine a frequency corresponding to the ripple voltage among the ripple references as the switching frequency.

Said controlling step (S40) may allow either one of the first processing unit 131 and the second processing unit 132 to control the switching operation of the switching unit 120 according to the determination result determined in the determination step S30.

Said controlling step (S40) may allow the first processing unit 131 to control the switching operation of the switching unit 120 or allow the second processing unit 132 to control the switching operation of the switching unit 120 according to whether the switching frequency corresponds to a preset first reference or a preset second reference.

The first and second references may be references for a range of the switching frequency.

The first reference and the second reference may be references in which the range is divided based on either one of the switching frequencies of the switching unit 210 for controlling the driving of the motor 210.

For instance, as shown in FIG. 5, within a frequency range in which the switching unit 210 performs a switching operation, frequencies less than x [KHZ] frequency are set to a first reference, and frequencies above x [KHZ] frequency are set to a second reference.

The first reference and the second reference may be preferably set based on either one of frequency values between 15 and 20 [KHZ].

For instance, the first reference may be frequencies between 0 and 20 [KHZ], and the second reference may be set to frequencies above 20 [KHZ].

Accordingly, the first reference may be set to a reference corresponding to low-speed switching frequencies, and the second reference may be set a reference corresponding to high-speed switching frequencies.

The control step (S40) may allow the first processing unit 131 to generate a control signal for controlling the switching operation of the switching unit 120 to apply it to the switching unit 120 when the switching frequency corresponds to the first reference.

Said control step (S40) may allow the second processing unit 132 to generates a control signal for controlling the switching operation of the switching unit 120 to apply it to the switching unit when the switching frequency corresponds to the second reference.

In other words, the control step (S40) may allow the first processing unit 131 to control the switching operation of the switching unit 120 when the switching frequency determined according to the ripple voltage corresponds to the first reference, and allow the second processing unit 132 to control the switching operation of the switching unit 120 when the switching frequency corresponds to the second reference.

Accordingly, the control method may allow the first processing unit 131 to control the switching operation of the switching unit 120 from 0 to x [KHZ] which is the first reference as a low-speed switching section, on a switching frequency graph as shown in FIG. 5, and allow the second processing unit 132 to control the switching operation of the switching unit 120 above x [KHZ] corresponding to the second reference as a high-speed switching section.

In other words, the control method may allow the first processing unit 131 composed of an MCU to control the switching operation of the switching unit 120 in a low-speed operation in a low-speed switching section in which the motor 210 operates in a low-speed operation region, and allow the second processing unit 132 composed of an FPGA to control the switching operation of the switching unit 120 in a high-speed operation in a high-speed switching section in which the motor 210 operates in a high-speed operation region.

As described above, the first processing unit 131 may be allowed to control when the switching operation of the switching unit 120 is controlled at low speed, and the second processing unit 132, which has a higher computational processing speed than the first processing unit 132, may be allowed to control when the switching operation of the switching unit 120 is controlled at high speed, thereby performing an appropriate operation processing according to the switching frequency and generating the control signal.

As described above, the control method may control the switching operation of the switching unit 120 to allow the switching unit 120 to perform a switching operation at an appropriate frequency at which the ripple voltage is limited, but allow the first processing unit 131 to control the switching operation of the switching unit 120 when the switching frequency corresponds to low-speed switching, and allow the second processing unit 132 to control the switching operation of the switching unit 120 when the switching frequency corresponds to high-speed switching, thereby allowing the switching unit 120 to perform a switching operation according to an appropriate frequency at which the ripple voltage is limited as well as performing appropriate and efficient switching to control according to the switching speed of the switching unit 120.

Though a specific embodiment according to the present disclosure has been described above, it will be apparent to those skilled in this art that various modification may be made without departing from the scope of the present disclosure. Therefore, the scope of the present disclosure should not be limited to the described embodiments, but should be determined by the scope of the appended claims and equivalents thereof.

Although the present disclosure has been described with respect to specific embodiments and drawings, the present disclosure is not limited to those embodiments, and it will be apparent to those skilled in the art that various changes and modifications can be made from the description disclosed herein. Consequently, the concept of the present disclosure should be construed in accordance with the appended claims, and all the same and equivalent changes will fall into the scope of the present disclosure.

| <REFERENCE NUMERALS> | |
|---|---|
| 10: External power supply | 100: Motor control device |
| 110: Smoothing unit | 120: Switching unit |
| 130: Control unit | 131: First processing unit |
| 132: Second processing unit(FPGA) | 140: Power supply unit |
| 150: Display unit | 1000: Motor control system |

What is claimed is:

1. A motor control device comprising:
a smoothing unit configured to smooth power received from an external power supply;
a switching unit configured to convert the power received from the smoothing unit into a driving power of a motor through a switching operation, and to output the converted driving power to the motor; and
a control unit configured to generate a control signal for controlling the switching operation of the switching unit according to a driving target of the motor, and to apply the generated control signal to the switching unit,
wherein the control unit comprises (i) a first processing unit and (ii) a second processing unit,
and is configured to, based on detecting a voltage and a current of the driving power, allow the first processing unit to measure a ripple voltage of the smoothing unit to thereby determine a switching frequency of the switching unit according to the ripple voltage,
wherein either one of the first processing unit or the second processing unit is allowed to generate the control signal according to the switching frequency, and
wherein the control unit is configured to:
based on the switching frequency being less than a preset frequency reference (i) allow the first processing unit to generate the control signal and (ii) apply the control signal to the switching unit, and
based on the switching frequency being above the preset frequency reference, allow the second processing unit to generate the control signal and apply the control signal to the switching unit.

2. The motor control device of claim 1, wherein the first processing unit comprises a micro controller unit (MCU), and
the second processing unit comprises a field programmable gate array (FPGA).

3. The motor control device of claim 1, wherein the control unit is configured to determine the switching frequency according to the ripple voltage based on a preset ripple reference.

4. The motor control device of claim 3, wherein the preset ripple reference is a reference for an appropriate frequency at which the ripple voltage is limited to a predetermined reference.

5. The motor control device of claim 1, wherein the first processing unit is configured to, based on the first processing unit computing a control command value according to the switching frequency, generate the control signal, and wherein the control signal is generated according to the control command value.

6. The motor control device of claim 5, wherein the second processing unit is configured to, based on the first processing unit applying the control signal to the switching unit, allow the control signal to bypass the second processing unit.

7. The motor control device of claim 1, wherein the second processing unit is configured to, based on the first processing unit computing a control command value according to the switching frequency and transferring the control command value to the second processing unit, generate the control signal, and wherein the control signal is generated according to the control command value received from the first processing unit.

8. A motor control system, comprising:
a motor configured to drive a compressor;
a smoothing unit configured to smooth power received from an external power supply;
a switching unit provided with a plurality of switching elements, wherein the switching unit is configured to convert the power received from the smoothing unit into a driving power of the motor through a switching operation, and to output the converted driving power to the motor; and
a control unit configured to control the switching operation of the switching unit according to a driving target of the motor, and to control the driving power of the motor,
wherein the control unit comprises:
a first processing unit configured to, based on detecting a voltage and a current of the driving power, measure a ripple voltage of the smoothing unit to thereby determine a switching frequency of the switching unit according to the ripple voltage, wherein the switching operation of the switching unit is controlled according to the switching frequency, based on the switching frequency corresponding to a preset first reference; and
a second processing unit configured to, based on the switching frequency corresponding to a preset second reference, control the switching operation of the switching unit according to the switching frequency.

9. The motor control system of claim 8, wherein the first processing unit comprises a micro controller unit (MCU), and
the second processing unit comprises a field programmable gate array (FPGA).

10. The motor control system of claim 8, wherein the first processing unit is configured to determine the switching frequency according to the ripple voltage based on a preset ripple reference.

11. The motor control system of claim 10, wherein the preset ripple reference is a reference for an appropriate frequency at which the ripple voltage is limited to a predetermined reference.

12. The motor control system of claim 8, wherein the preset first reference and the preset second reference are references for a range of the switching frequency.

13. The motor control system of claim 8, wherein the control unit is configured to, based on the switching frequency corresponding to the preset first reference, allow the first processing unit to compute a control command value, wherein the first processing unit generates a control signal for controlling the switching operation according to the control command value.

14. The motor control system of claim 13, wherein the second processing unit is configured to, based on the first processing unit generating the control signal, receive the control signal from the first processing unit and bypass the received control signal to the switching unit.

15. The motor control system of claim 8, wherein the control unit is configured to, based on the switching frequency corresponding to the preset second reference, allow the first processing unit to compute a control command value according to the switching frequency,
wherein the control command value is transferred to the second processing unit, and the second processing unit is allowed to generate a control signal for controlling the switching operation of the switching unit.

16. A motor control method of a motor control device, wherein the motor control device comprises (i) a smoothing unit configured to smooth power received from an external power supply, (ii) a switching unit configured to convert the power received from the smoothing unit into a driving power of a motor through a switching operation and to output the converted driving power to the motor, and (iii) a control unit provided with a first processing unit and a second processing unit, configured to control a switching operation of the switching unit according to a driving target of the motor, the motor control method comprising:

allowing the first processing unit to detect a voltage and a current of the driving power;
measuring a ripple voltage of the smoothing unit based on detecting the voltage and the current;
determining a switching frequency of the switching unit based on the ripple voltage and a preset ripple reference; and
allowing either one of the first processing unit and the second processing unit to control the switching operation of the switching unit according to the switching frequency.

17. The motor control method of claim 16, wherein said determining step comprises determining an appropriate frequency at which the ripple voltage is limited to a predetermined reference as the switching frequency of the switching unit according to the ripple voltage based on the preset ripple reference.

18. The motor control method of claim 16, wherein said controlling step comprises comparing the switching frequency with a preset frequency reference to allow either one of the first processing unit and the second processing unit to control the switching operation of the switching unit.

19. The motor control method of claim 18, wherein said controlling step further comprises allowing the first processing unit to control the switching operation of the switching unit when the switching frequency is less than the preset frequency reference, and allowing the second processing unit to control the switching operation of the switching unit when the switching frequency is above the preset frequency reference.

* * * * *